(12) United States Patent
Tamaki

(10) Patent No.: US 8,177,879 B2
(45) Date of Patent: May 15, 2012

(54) ARC START MATERIAL FOR ELECTROSLAG REMELTING OF SUPERALLOY AND ARC STARTING METHOD EMPLOYING THE ARC START MATERIAL

(75) Inventor: Tetsuo Tamaki, Okegawa (JP)

(73) Assignee: Mitsubishi Materials Corporation, Tokyo (JP)

( * ) Notice: Subject to any disclaimer, the term of this patent is extended or adjusted under 35 U.S.C. 154(b) by 162 days.

(21) Appl. No.: 12/279,595

(22) PCT Filed: Mar. 27, 2007

(86) PCT No.: PCT/JP2007/056407
§ 371 (c)(1),
(2), (4) Date: Aug. 15, 2008

(87) PCT Pub. No.: WO2007/116740
PCT Pub. Date: Oct. 18, 2007

(65) Prior Publication Data
US 2010/0229683 A1    Sep. 16, 2010

(30) Foreign Application Priority Data

Mar. 29, 2006 (JP) .................................. 2006-089671
Mar. 19, 2007 (JP) .................................. 2007-070245

(51) Int. Cl.
*C22B 7/00* (2006.01)
*C22B 9/18* (2006.01)
(52) U.S. Cl. ........................................... 75/306; 75/314
(58) Field of Classification Search ..................... 75/306
See application file for complete search history.

(56) References Cited

U.S. PATENT DOCUMENTS 6,255,377 B1 * 7/2001 Hamami ........................ 524/439

FOREIGN PATENT DOCUMENTS

| JP | 54-128935 | 10/1979 |
| JP | 58-151433 | 9/1983 |
| JP | 02-034730 | 2/1990 |
| JP | 02034730 A * | 2/1990 |
| JP | 6-262347 | 9/1994 |
| JP | 6-265570 | 9/1994 |
| JP | A-2006-0265570 | 10/2006 |

OTHER PUBLICATIONS

Baba et al. Japanese Kokai Patent Publication No. H02-034730 (English translation). Published Feb. 4, 1990.*

* cited by examiner

*Primary Examiner* — George Wyszomierski
*Assistant Examiner* — Tima M McGuthry Banks
(74) *Attorney, Agent, or Firm* — Leason Ellis LLP

(57) ABSTRACT

This arc start material for electroslag remelting comprises an aggregate of curled turning chips of superalloy. This arc starting method for electroslag remelting comprises starting electroslag remelting by generating an arc between a primary ingot electrode including a primary ingot and an arc start material for electroslag remelting, wherein the primary ingot electrode is energized while contacting with the arc start material for electroslag remelting including an aggregate of curled turning chips of superalloy, and then an arc is generated between the primary ingot electrode and the arc start material for electroslag remelting of superalloy by separating the primary ingot electrode from the arc start material for electroslag remelting of superalloy.

1 Claim, 2 Drawing Sheets

ARC START MATERIAL FOR ELECTROSLAG REMELTING OF SUPERALLOY AND ARC STARTING METHOD EMPLOYING THE ARC START MATERIAL

CROSS-REFERENCE TO RELATED APPLICATIONS

This is the U.S. national phase application under 35 U.S.C. §371 of International Patent Application No. PCT/JP2007/056407, filed Mar. 27, 2007, and claims the benefit of Japanese Patent Application Nos. 2006-089671 and 2007-070245, filed Mar. 29, 2006 and Mar. 19, 2007, respectively. The international application and both priority documents are incorporated by reference herein in their entirety. The International Application published in Japanese on Oct. 18, 2007 as International Publication No. WO 2007/116740 A1 under PCT Article 21(2).

This application is a national stage entry of PCT/JP2007/056407 filed Mar. 27, 2007.

TECHNICAL FIELD

The present invention relates to an arc start material for stable starting of arcing with low electrical power during electroslag remelting (ESR) of superalloy ingots (Ni-, Co- or Fe-based corrosion-resistant and heat-resistant alloys), and to an arc starting method employing the arc start material.

This application claims priority from Japanese Patent Application No. 2006-89671 filed on Mar. 29, 2006, and Japanese Patent Application No. 2007-70245 filed on Mar. 19, 2007, the contents of which are incorporated herein by reference.

BACKGROUND ART

Chemical plant parts, gas turbines and the like are typically manufactured using superalloy ingots. Since various types of parts, including rotors of gas turbines and the like, frequently lead to serious accidents if they become damaged during the course of use while also causing considerable losses to be incurred as a result of such damage, superalloy ingots are required to demonstrate particularly severe soundness. Consequently, secondary ingots offering even greater soundness are manufactured by ESR in which primary ingots obtained by melting and casting superalloys are used as electrodes.

In order to manufacture sound secondary ingots by ESR using primary ingots of superalloys as electrodes, a primary ingot of superalloy is first used as an electrode to generate an arc between this electrode and a starter plate, flux is melted by this arc heat to form molten slag, and once the molten slag is formed, a current is applied to the molten slag while redissolving the superalloy primary ingot electrode by using the molten slag as a resistance heating element. Liquid droplets of the remelted superalloy settle due to differences in specific gravity within the molten slag, and the remelted superalloy is refined by the molten slag as it settles; thereby, promoting removal of inclusions and desulfurization. Moreover, a metal pool directly beneath the molten slag undergoes directional solidification by a water-cooled copper mold, enabling the structure to be controlled and allowing the production of a secondary ingot having even greater soundness.

The aspect of the aforementioned ESR procedure that requires the greatest expertise is the task of generating an arc at the start of ESR and dissolving the flux to form molten slag. In this procedure, unless sufficient arc is generated for dissolving the flux, ESR may fail to start, and in the case of such failure, the important, large primary ingot electrode including superalloy, the slag and the start material must be removed and repositioned; thereby, requiring considerable time and labor for restarting ESR. Thus, failure to start ESR must be avoided whenever possible.

On the other hand, an arc start material is known to be typically used in order to start ESR with a stable arc, and examples of arc start materials used include metal powder, metal wool, cut wire and start blocks. These arc start materials such as metal powder, metal wool, cut wire and start blocks are known to be used by mixing with flux (see Patent Documents 1 and 2).

Patent Document 1: Japanese Unexamined Patent Application, First Publication No. H6-262347
Patent Document 2: Japanese Unexamined Patent Application, First Publication No. H6-265570

DISCLOSURE OF THE INVENTION

Problems to be Solved by the Invention

Superalloy powder, superalloy metal wool or cut wire obtained by cutting superalloy wire and the like can also be used as the arc start material when carrying out ESR using a primary ingot of superalloy as the electrode. However, this superalloy powder, superalloy metal wool or superalloy cut wire are all expensive due to high production costs. Moreover, the success rate when using these arc start materials to start ESR is not high. Although the current is typically increased in order to improve the success rate, when the current is increased for the purpose of improving success rate, there is increased susceptibility to damage of the water-cooled copper mold and running costs consisting of electrical power costs and material costs increase.

In addition, since primary ingots used as electrodes are typically fabricated by casting, shrinkage cavities form in the head of the primary ingot. Since it is necessary to weld a power supply bus bar (not shown) to the bottom of the primary ingot to allow a primary ingot in which a shrinkage cavity has formed in the head thereof to be used as an ESR electrode, it is necessary to arrange the head of a primary ingot having a shrinkage cavity in the bottom of an ESR mold. A depression portion is typically formed in the head of a primary ingot having a shrinkage cavity, and when the head of a primary ingot having a depression portion formed by a shrinkage cavity is arranged in the bottom of an ESR mold, and ESR is attempted to be started using a conventional arc start material, the depression portion of the shrinkage cavity prevents uniform contact with the conventional arc start material, and fluctuations occur in the interval of the gap formed between the primary ingot and the arc start material; thereby, resulting in localization of arcing that leads to problems such as a decrease in the success rate of arc starting.

Means for Solving the Problems

Therefore, the inventors of the present invention conducted research to obtain an arc start material for ESR of superalloy that is less expensive, easier and yields a higher success rate than the prior art. As a result, the following findings were obtained. An aggregate of turning chips of superalloy was fabricated by gathering turning chips of superalloy having curls generated during shaping superalloy materials on a lathe, filling the curled turning chips into a form, and either gently press forming or flame-hardening with a burner. When ERS is carried out on superalloy using the aggregate of turning chips of superalloy as an arc start material, arcing can be started at a success rate of 100% even if initial arcing is started at a low voltage at the start of ESR. In addition, since initial arcing can be started at a low voltage, there is little damage to starter plates. Therefore, the thickness of the starter plates can be reduced to a greater extent than in the prior art. Moreover, since the arc start material including an aggregate of turning chips of superalloy of the present invention can be fabricated by recycling turning chips generated when lathing superalloy materials, costs can be reduced dramatically as compared with conventional ark start material including cut wires obtained by cutting wire, powders or metal wool, while also making it possible to further improve the success rate of arc starting.

The present invention was completed on the basis of the findings indicated above.

(1) An arc start material for electroslag remelting of superalloy of the present invention includes an aggregate of curled turning chips of superalloy.

In the present invention, the superalloy is a Ni-based, Fe-based or Co-based heat-resistant and corrosion-resistant alloy, Ni-based heat-resistant and corrosion-resistant alloys are defined in JIS standards NCF600, NCF601, NCF625, NCF690, NCF718, NCF750, NCF751 and NCF80A, Fe-based heat-resistant and corrosion-resistant alloys are defined in JIS standards NCF800, NCF800H and NCF825, and Co-based heat-resistant and corrosion-resistant alloys are defined in AMS5772 and AMS5608.

The production process of the arc start material for ESR of superalloy of the present invention is explained based on FIG. 1. In FIG. 1, reference symbol 1 indicates a base, 2 a form, 3 turning chips of superalloy, 4 a burner and 5 a pressure plate. In order to manufacture the arc start material for ESR of superalloy of the present invention, turning chips 3 generated during lathing of superalloy ingots are gathered and filled into the form 2 placed on the base 1, and the turning chips of superalloy ingot 3 are heated with the burner 4. As a result of heating with this burner 4, simultaneous to removing lathing oil that became adhered during lathing, the turning chips of superalloy ingot 3 are annealed to facilitate molding. As a result of heating with the burner 4, the turning chips of superalloy ingot 3 are deformed and filled into the form 2, resulting in the formation of an aggregate of turning chips of superalloy. In this case, the aggregate may also be molded by pressing with the pressure plate 5 from above as necessary.

(2) In the arc start material for electroslag remelting of superalloy of the present invention, the curled turning chips of superalloy may comprise turning chips of superalloy having at least one coil.

Although turning chips generated during lathing are typically categorized into particles, sheets, strips or curls having one or more coils, the turning chips of superalloy ingot 3 for producing the arc start material for ESR of superalloy of the present invention are more preferably turning chips in the form of curls having one or more coils (circular arcs, whorls, spiral forms, and the like). In an arc start material including an aggregate of turning chips of superalloy fire-hardened by heating these curled turning chips in the form of curls having one or more coils, the curls fulfill the role of springs, and when the electrode is intentionally raised to generate a starting arc from an electrically short-circuited state at the start of electroslag melting, the elasticity of the springs fulfills the role of adjusting the electrode to a suitable position for generating initial arc.

(3) A first aspect of an arc starting method for electroslag remelting of superalloy of the present invention includes starting electroslag remelting by generating an arc between an electrode including a primary ingot (to be referred to as the primary ingot electrode) and an arc start material for electroslag remelting, wherein the primary ingot electrode is energized while contacting with the arc start material for electroslag remelting including an aggregate of curled turning chips of superalloy, and then an arc is generated between the primary ingot electrode and the arc start material for electroslag remelting of superalloy by separating the primary ingot electrode from the arc start material for electroslag remelting of superalloy.

(4) A second aspect of an arc starting method for electroslag remelting of superalloy of the present invention includes starting electroslag remelting by generating an arc between an electrode including a primary ingot (to be referred to as the primary ingot electrode) and an arc start material for electroslag remelting, wherein the primary ingot electrode is energized while pressing against the arc start material for electroslag remelting including an aggregate of curled turning chips of superalloy to compress and compact the arc start material for electroslag remelting including an aggregate of turning chips of superalloy, and then an arc is generated by separating the primary ingot electrode from the arc start material for electroslag remelting of superalloy.

(5) In the arc starting method for electroslag remelting of superalloy of (3) or (4) above, the arc start material for electroslag remelting including an aggregate of curled turning chips of superalloy may be an arc start material for electroslag remelting of superalloy including curled turning chips of superalloy having at least one coil.

FIG. 2 is a cross-sectional view showing the start of ESR using the arc start material of the present invention and using a primary ingot of superalloy as an electrode. In FIG. 2, reference symbol 6 indicates a water-cooled substrate, 7 a water-cooled mold, and 8 a starter plate. These are assembled into an ESR furnace firmly joined together with bolts 9. Furthermore, starter plate 8 is fabricated from superalloy having the same composition as the superalloy primary ingot. An arc start material 10 including an aggregate of turning chips of superalloy fabricated in FIG. 1 is placed on the starter plate 8 in the assembled ESR furnace, the superalloy primary ingot is placed as an electrode 11 on this arc start material 10 so as to make contact with the arc start material 10, and a flux 12 is filled into the gap between the inner walls of the water-cooled mold 7 and the arc start material 10 and the gap between the inner walls of the water-cooled mold 7 and the electrode 11. When initial arcing is started by applying an alternating voltage between the electrode 11 and the starter plate 8 and then separating the superalloy primary ingot electrode 11 from the arc start material 10 while in this state, ESR can be started at a success rate of nearly 100%.

The arc start material for electroslag remelting of superalloy of the present invention described in (1) or (2) above enables initial arcing to be started at a success rate of 100% even if a primary ingot in which an end thereof has a complex shape, such as in the manner of having a shrinkage cavity in the head thereof, is used as an electrode. The specific method thereof is explained using the example of the case of using a primary ingot having a shrinkage cavity in the head thereof as the electrode. When the head of a primary ingot having a shrinkage cavity in the head thereof is used as an electrode and is briefly energized while pressing the head thereof against the arc start material for electroslag remelting of superalloy of the present invention described in (1) or (2) above, the arc start material softens as a result of energization, the arc start material deforms according to the depression shape of the shrinkage cavity in the head of the primary ingot causing it to be further compressed and compacted, and the shape of the depression portion of the shrinkage cavity in the head of the primary ingot is transferred to the arc start material; thereby, resulting in uniform contact. When the primary ingot electrode having a shrinkage cavity in the head thereof is separated from the arc start material for electroslag remelting of superalloy of the present invention described in (1) or (2) above, even in the case the end surface of the primary ingot is not flat due to the presence of a shrinkage cavity and the like, the interval of the gap between the primary ingot electrode and the arc start material for electroslag remelting is constant; thereby, enabling initial arcing to be started at a success rate of 100%.

In this arc starting method for electroslag remelting, it is preferable to press the arc start material for electroslag remelting including an aggregate of curled turning chips of superalloy with the primary ingot electrode at a load of 100 kPa or more, and it is preferable to press the arc start material simultaneous to energization. Although the longer the duration of pressing the better, the arc start material can be plastically deformed to the shape of the end surface of the primary ingot electrode if pressed for 1 minute or more. And then, by lifting the primary ingot electrode, a gap is formed between the primary ingot electrode and the arc start material resulting in the generation of an arc. A distance of 1 to 5 mm is adequate for the distance by which the primary ingot electrode is lifted.

Moreover, by using this arc starting method for electroslag remelting, since the primary ingot electrode and the arc start material are pressed together, solid slag filled around the periphery of the primary ingot electrode during pressing is prevented from entering the gap between the primary ingot electrode and the arc start material. Since solid slag becomes an insulator if allowed to enter the gap between the primary ingot electrode and the arc start material, it can cause destabilization of arc generation. Since a gap is not formed between the primary ingot electrode and the arc start material during pressing in this manner, there is also the effect of being able to stably start ESR even if the entire amount of solid slag is added at the start of ESR, without additionally add solid slag during stabilization of remelting. Since solid slag does not have to be additionally added, it is not necessary to provide incidental equipment for that additional addition; thereby, making it possible to increase the stability range of remelted ingots.

Effects of the Invention

Since the arc start material of the present invention is fabricated using turning chips generated during lathing, it enables costs to be reduced while also allowing ESR of superalloy to be carried out without failure even if the starting current is set to a low level.

In addition, the electroslag remelting method of the present invention is capable of maintaining a constant gap between a primary ingot and an arc start material even if the end surface of the primary ingot has a complex shape which is not smooth due to the presence of a shrinkage cavity and the like; thereby, enabling arcing between the primary ingot and the arc start material to be started both stably and continuously at a success rate of 100%.

DESCRIPTION OF THE REFERENCE SYMBOLS

1: base, 2: form, 3: turning chips of superalloy, 4: burner, 5: pressure plate, 6: water-cooled substrate, 7: water-cooled mold, 8: starter plate, 9: bolts, 10: arc start material including aggregate of turning chips of superalloy, 11: electrode, 12: flux.

BEST MODE FOR CARRYING OUT THE INVENTION

EXAMPLE 1

A superalloy primary ingot was prepared having a composition including Cr at 22% by mass, Co at 1.5% by mass, Fe at 18.5% by mass, Mo at 9% by mass, W at 0.6% by mass, Al at 0.3% by mass, Ti at 0.3% by mass and C at 0.07% by mass, with the remainder being composed of Ni and unavoidable impurities, and having dimensions including a diameter of 420 mm and length of 2600 mm.

Figure 1:
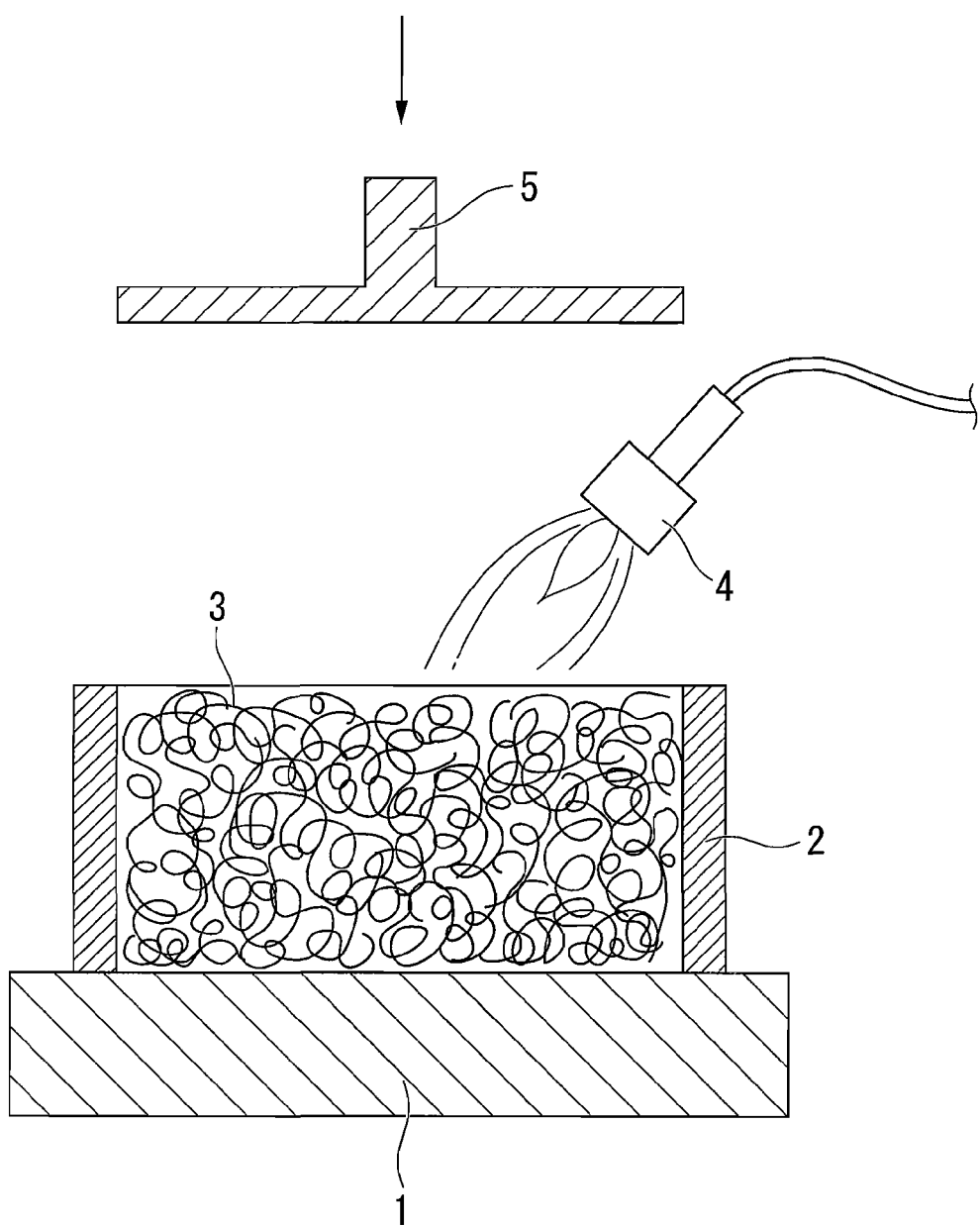
FIG. 1 is an explanatory drawing for explaining a method for producing an arc start material including an aggregate of turning chips of superalloy of the present invention.
Figure 2:
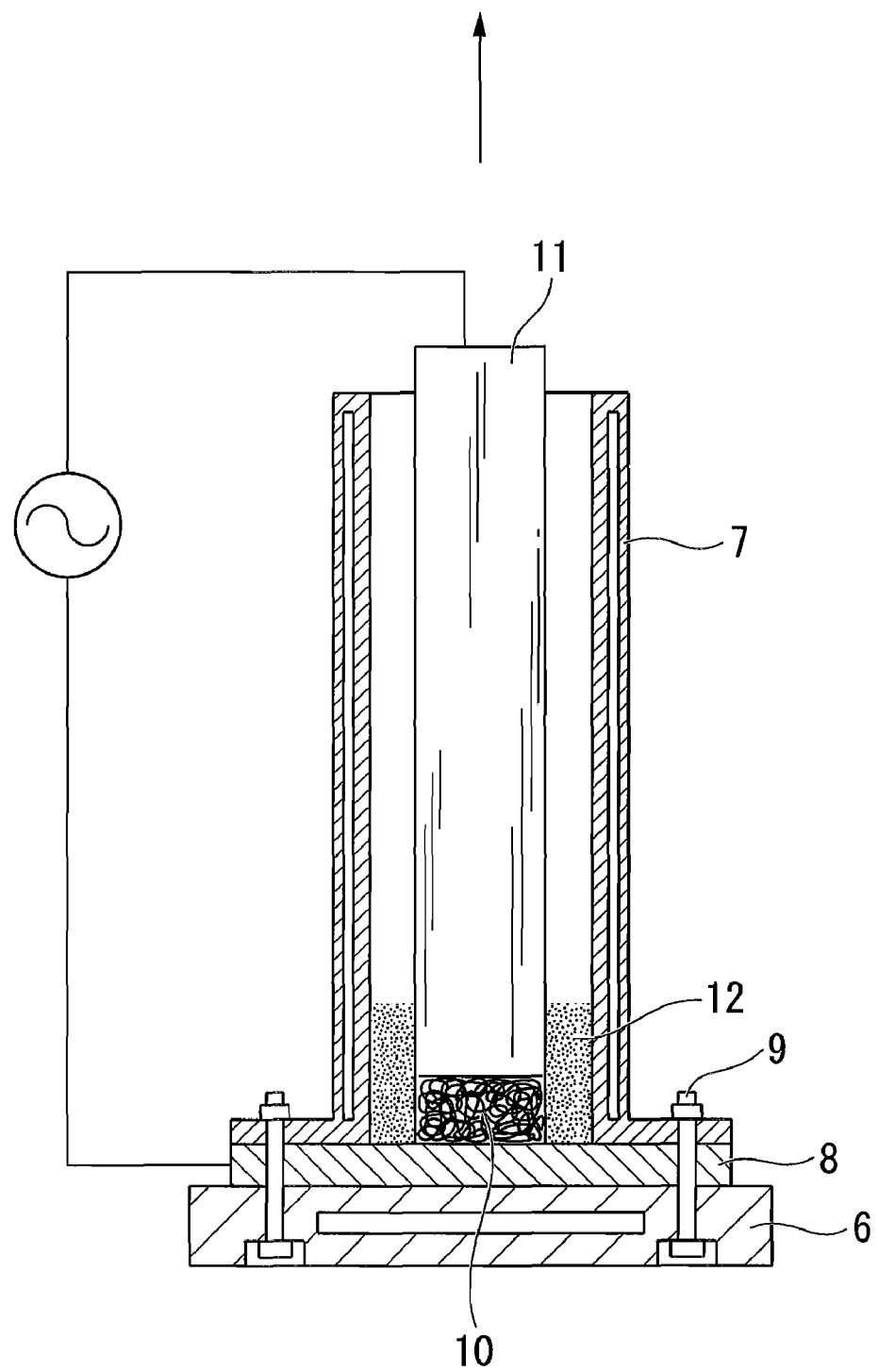
FIG. 2 is an explanatory drawing for explaining a method for starting ESR by using an arc start material including an aggregate of turning chips of superalloy of the present invention.

Moreover, curled turning chips having one or more coils and having the same composition as the above superalloy were prepared, placed in a form like that shown in FIG. 1, and hardened by pressing while firing with a burner to fabricate an arc start material composed of an aggregate of the turning chips of superalloy of the present invention.

Moreover, a starter plate was prepared having the same composition as the superalloy and having a thickness of 12 mm.

Moreover, a water-cooled substrate made of pure copper, a water-cooled mold made of pure copper and the starter plate made of superalloy prepared above were firmly joined together with bolts to assemble an ESR furnace, and an arc start material composed of an aggregate of turning chips of superalloy and having dimensions including a diameter of 430 mm and height of 140 mm was placed on the starter plate. A superalloy primary ingot was then placed on the arc start material to serve as an electrode, and flux was filled into the gap between the inner walls of the water-cooled mold and the arc start material and into the gap between the inner walls of the water-cooled mold and the electrode. Then by applying an alternating electrical power of 420 kW, using a current of 12000 A and voltage of 35 V, between the electrode and the starter plate, ESR was able to be started while enabling initial arcing to be started at a success rate of 100%.

PRIOR ART EXAMPLE 1

A mixture of an arc start material, composed of cut wire of superalloy having the same composition as superalloy ingot and having dimensions including a diameter of 430 mm and height of 140 mm, and flux were filled onto the starter plate of the ESR furnace assembled in Example 1, and then a superalloy primary ingot is placed on the mixture of the arc start material and the flux to serve as an electrode. Initial arcing was started by applying alternating electrical power of 1000 kW using a current of 20000 A and voltage of 50 V; thereby, ESR was Started. Under these conditions, initial arcing was only able to be started 7 of 15 times.

EXAMPLE 2

A superalloy primary ingot was prepared having a composition including Cr at 20% by mass, Ni at 34% by mass, Cu at 3.5% by mass, No at 2.5% by mass, Nb at 0.8% by mass, Al at 0.2% by mass and C at 0.03% by mass, with the remainder being composed of Fe and unavoidable impurities, and having dimensions including a diameter of 420 mm and length of 2600 mm.

Moreover, curled turning chips having one or more coils and having the same composition as the above superalloy were prepared, placed in a form like that shown in FIG. 1, and hardened by pressing while firing with a burner to fabricate an arc start material composed of an aggregate of turning chips of superalloy of the present invention.

Moreover, a starter plate was prepared having the same composition as the superalloy and having a thickness of 12 mm.

Moreover, a water-cooled substrate made of pure copper, a water-cooled mold made of pure copper and the starter plate made of superalloy prepared above were firmly joined together with bolts to assemble an ESR furnace, and an arc start material composed of an aggregate of turning chips of superalloy and having dimensions including a diameter of 430 mm and height of 140 mm was placed on the starter plate. A superalloy primary ingot was then placed on the arc start material to serve as an electrode, and flux was filled into the gap between the inner walls of the water-cooled mold and the arc start material and into the gap between the inner walls of the water-cooled mold and the electrode. Initial arcing was started by applying an alternating electrical power of 420 kW, using a current of 12000 A and voltage of 35 V, between the electrode and the starter plate; thereby, ESR was started. Under these conditions, ESR was able to be started while enabling initial arcing to be started at a success rate of 100%.

PRIOR ART EXAMPLE 2

A mixture of an arc start material, composed of cut wire of superalloy having the same composition as superalloy ingot and having dimensions including a diameter of 430 mm and height of 140 mm, and flux were filled onto the starter plate of the ESR furnace assembled in Example 2, and then a superalloy primary ingot is placed on the mixture of the arc start material and the flux to serve as an electrode. Initial arcing is started by applying alternating electrical power of 1000 kW using a current of 20000 A and voltage of 50 V; thereby, ESR was started. Under these conditions, initial arcing was only able to be started 3 of 6 times.

EXAMPLE 3

A superalloy primary ingot was prepared having a composition including Cr at 22% by mass, Ni at 22% by mass, W at 14% by mass, La at 0.07% by mass, Si at 0.3% by mass and C at 0.1% by mass, with the remainder being composed of Co and unavoidable impurities, and having dimensions including a diameter of 360 mm and length of 2500 mm.

Moreover, curled turning chips having one or more coils and having the same composition as the above superalloy were prepared, placed in a form like that shown in FIG. 1, and hardened by pressing while firing with a burner to fabricate an arc start material composed of an aggregate of turning chips of superalloy of the present invention.

Moreover, a starter plate was prepared having the same composition as the superalloy and having a thickness of 12 mm.

Moreover, a water-cooled substrate made of pure copper, a water-cooled mold made of pure copper and the starter plate made of superalloy prepared above were firmly joined together with bolts to assemble an ESR furnace, and an arc start material composed of an aggregate of turning chips of superalloy and having dimensions including a diameter of 360 mm and height of 140 mm was placed on the starter plate. A superalloy primary ingot was then placed on the arc start material to serve as an electrode, and flux was filled into the gap between the inner walls of the water-cooled mold and the arc start material and into the gap between the inner walls of the water-cooled mold and the electrode. Initial arcing was started by applying an alternating electrical power of 420 kW, using a current of 12000 A and voltage of 35 V, between the electrode and the starter plate; thereby, ESR was started. Under these conditions, ESR was able to be started while enabling initial arcing to be started at a success rate of 100%.

PRIOR ART EXAMPLE 3

A mixture of an arc start material, composed of cut wire of superalloy having the same composition as superalloy ingot and having dimensions including a diameter of 360 mm and height of 140 mm, and flux were filled onto the starter plate of the ESR furnace assembled in Example 3, and then a superalloy primary ingot is placed on the mixture of the arc start material and the flux to serve as an electrode. Initial arcing was started by applying alternating electrical power of 1000 kW using a current of 20000 A and voltage of 50 V; thereby, ESR was started. Under these conditions, initial arcing was only able to be started 2 of 5 times.

EXAMPLE 4

A superalloy primary ingot was prepared having a composition comprised of Cr at 22% by mass, Ni at 22% by mass, W at 14% by mass, La at 0.07% by mass, Si at 0.3% by mass and C at 0.1% by mass, with the remainder being composed of Co and unavoidable impurities, and having dimensions including a diameter of 360 mm and length of 2500 mm. A shrinkage cavity in the shape of an inverted cone having a depth of 50 mm and diameter of 300 mm was formed in the head of the primary ingot during casting. The superalloy primary ingot was inserted into the ESR mold with the shrinkage cavity facing downward. Moreover, curled turning chips having one or more coils and having the same composition as the above superalloy were prepared, placed in a form like that shown in FIG. 1, and hardened by pressing while firing with a burner to fabricate an arc start material composed of an aggregate of turning chips of superalloy of the present invention. Moreover, a starter plate was prepared having the same composition as the superalloy and having a thickness of 12 mm.

Moreover, a water-cooled substrate made of pure copper, a water-cooled mold made of pure copper and the starter plate made of superalloy prepared above were firmly joined together with bolts to assemble an ESR furnace, and the arc start material composed of an aggregate of turning chips of superalloy and having dimensions including a diameter of 360 mm and height of 140 mm was placed on the starter plate. The superalloy primary ingot was then placed on the arc start material to serve as an electrode, and flux was filled into the gap between the inner walls of the water-cooled mold and the arc start material and into the gap between the inner walls of the water-cooled mold and the electrode. The arc start material for electroslag remelting was pressed with the superalloy primary ingot at a load of 250 kPa for 3 minutes while applying alternating electrical power of 1000 kW, using a current of 20000 A and voltage of 50 V, between the electrode and the starter plate, and then initial arcing was started by raising the superalloy primary ingot by 5 mm; thereby, ESR was started. Under these conditions, ESR was able to be started while enabling initial arcing to be started at a success rate of 100% even with a superalloy primary ingot in which a shrinkage cavity had formed.

PRIOR ART EXAMPLE 4

ESR was started by starting initial arcing under the same conditions as Example 4 and using the superalloy primary ingot with the exception of using cut wire of superalloy measuring 360 mm in diameter and 140 mm in height as the arc start material. Under these conditions, initial arcing was unable to be started even once in five tries.

As is clear from Examples 1 through 4 and Prior Art Examples 1 through 4, when ESR was started using an arc start material including an aggregate of turning chips of superalloy of the present invention, arcing was able to be started at a success rate of 100% even if initial arcing was started at low current, low voltage or low output. In addition, since initial arcing can be started at low current, there is little damage to the starter plate; thereby, enabling the thickness of the starter plate to be thinner than in the prior art. Moreover, since the arc start material including an aggregate of turning chips of superalloy of the present invention can be fabricated by recycling turning chips generated during lathing, costs can be reduced dramatically as compared with conventional arc start materials composed of cut wires obtained by cutting wire, powders or metal wool.

Industrial Applicability

In the present invention, costs can be reduced since an arc start material can be fabricated by using turning chips generated during lathing. Moreover, electroslag remelting (ESR) of superalloy (Ni-based, Co-based or Fe-based corrosion-resistant and heat-resistant alloy) can be conducted without failure even if the starting current is set to a low level. Consequently, the present invention can be preferably applied to an electroslag remelting process for superalloy ingots.

The invention claimed is:

1. An arc start material for electroslag remelting of superalloy, consisting essentially of an aggregate of curled turning chips of superalloy having at least one coil with the elasticity of a spring, and
    wherein the aggregate of curled turning chips of superalloy has a press-formed and flame-hardened structure, and
    the aggregate of curled turning chips of superalloy at a start of electroslag melting possesses the elasticity of a spring such that it is capable of adjusting an electrode to a suitable position for generating an initial arc.

* * * * *